(12) United States Patent
Mori

(10) Patent No.: US 6,560,002 B2
(45) Date of Patent: May 6, 2003

(54) OPTICAL SWITCH

(75) Inventor: Keiichi Mori, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 0 days.

(21) Appl. No.: 09/992,214

(22) Filed: Nov. 14, 2001

(65) Prior Publication Data

US 2002/0057484 A1 May 16, 2002

(30) Foreign Application Priority Data

Nov. 15, 2000 (JP) ........................ 2000-348378

(51) Int. Cl.[7] .................. G02F 1/03; G02B 26/08; G02B 26/00; H02K 35/00; F16M 9/00
(52) U.S. Cl. ............... 359/247; 359/224; 359/231; 359/254; 359/291; 359/293; 359/295; 310/36; 310/90; 73/504.02; 267/3; 267/140.5; 347/255; 257/418
(58) Field of Search .................. 359/247, 254, 359/214, 224, 230, 231, 320, 290, 291, 292, 293, 295, 871; 310/90, 309, 36; 73/504.02, 504.12; 257/418, 420; 267/3, 140.5, 136; 347/255, 135

(56) References Cited

U.S. PATENT DOCUMENTS

| 5,016,072 | A | * | 5/1991 | Greiff | 257/418 |
| 5,745,281 | A | * | 4/1998 | Yi et al. | 359/290 |
| 6,108,121 | A | * | 8/2000 | Mansell et al. | 359/291 |
| 6,147,789 | A | * | 11/2000 | Gelbart | 359/231 |
| 6,175,443 | B1 | * | 1/2001 | Aksyuk et al. | 359/291 |
| 6,178,033 | B1 | * | 1/2001 | Ford et al. | 359/247 |
| 6,275,326 | B1 | * | 8/2001 | Bhalla et al. | 359/298 |
| 6,278,541 | B1 | * | 8/2001 | Baker | 359/291 |
| 6,377,145 | B1 | * | 4/2002 | Kumagai | 310/36 |
| 6,459,523 | B2 | * | 10/2002 | Ueda | 359/290 |
| 6,480,320 | B2 | * | 11/2002 | Nasiri | 359/291 |

* cited by examiner

*Primary Examiner*—Loha Ben
(74) *Attorney, Agent, or Firm*—David N. Lathrop, Esq.; Gallagher & Lathrop

(57) ABSTRACT

An optical switch that any vibration or oscillation transmitted to the optical switch from the outside is substantially prevented from being transmitted to a movable electrode is provided. In an optical switch comprising: a stationary electrode; a movable electrode opposed to the stationary electrode with a predetermined space therebetween; and a mirror mounted to the movable electrode, wherein the movable electrode and the mirror are moved together by applying a voltage between the stationary electrode and the movable electrode thereby to switch the path of an incident optical signal to the optical switch, a buffer member provided with a diaphragm is attached to the bottom of the stationary electrode, and a vibration or oscillation is substantially prevented from being transmitted to the movable electrode by the damping effects of the diaphragm and the space area formed above the diaphragm.

7 Claims, 7 Drawing Sheets

OPTICAL SWITCH

BACKGROUND OF THE INVENTION

1. Field of the Invention

The present invention relates to an optical switch used in changing the path of an optical signal, and more particularly, to an optical switch configured such that even if a vibration or oscillation should be transmitted to the optical switch, the operating or performance characteristic of the optical switch is not deteriorated.

2. Description of the Related Art

For the purpose of changing the path of an optical signal propagating through an optical waveguide such as an optical fiber, various types of optical switches have been heretofore used. An example of the prior art optical switch will be described with reference to FIGS. 1 to 4.

FIG. 1 is a plan view illustrating a construction of the prior art optical switch, and FIG. 2 is a sectional view taken along the line 2—2 in FIG. 1 and looking in the direction indicated by the arrows. The illustrated switch SW comprises: a movable electrode supporting frame 10 of a generally square in plan; a stationary electrode substrate 8 of a generally square in plan that closes the interior space of the movable electrode supporting frame 10; a movable electrode plate 2 of a generally square in plan that is disposed substantially in parallel with the stationary electrode substrate 8 with a space or gap between them generally in the center of the top surface of the stationary electrode substrate 8, that is, generally in the center of the movable electrode supporting frame 10; four elastic and flexible beams 21 for supporting the movable electrode plate 2 for up and down or vertical motion, each beam having a plurality of meanders or sharply turning portions, one end thereof being fixed to corresponding one of the four sides of the movable electrode plate 2 generally in the center of the side and the other end thereof being fixed to corresponding one of the four sides of the movable electrode supporting frame 10 generally in the center of the side; and a mirror 3 mounted on the center of the top surface of the movable electrode plate 2 along one diagonal line thereof.

Generally in the center of each of the four sides of the movable electrode supporting frame 10 is formed a post-like connecting portion 211 protruding upwardly and formed integrally with the supporting frame 10. The other end of each beam 21 is fixed to corresponding one of these connecting portions 211.

The movable electrode supporting frame 10 is configured by boring a generally square opening 12 through a silicon substrate of a generally square in plan, the opening 12 being bored concentrically with the silicon substrate. In case of boring the opening 12, as will be easily understood from FIG. 2, it is preferable that the opening 12 is perforated such that the wall surface of the opening 12 has a taper or slant so that the bore (size) of the opening 12 is gradually increased toward the lower portion thereof, and also it is preferable that the outer wall surface of the generally square stationary electrode substrate 8 is formed so as to have the same taper or slant as that of the opening 12. It is needless to say that the thickness of the stationary electrode substrate 8 is set to the same value as that of the silicon substrate (the depth of the opening 12). By such arrangements, it is possible to fit and fix the stationary electrode substrate 8 in the opening 12 of the movable electrode supporting frame 10 in the state that the stationary electrode substrate 8 is electrically insulated from the supporting frame 10 by inserting the stationary electrode substrate 8 into the opening 12 from the bottom side thereof. As a result, the movable electrode supporting frame 10 and the stationary electrode substrate 8 are integrally coupled and become one plate-like body of a generally square.

Further, as one method of electrically insulating the junction between the movable electrode plate 2 and the stationary electrode substrate 8, it is considered that the stationary electrode substrate 8 will be formed out of an n-type silicon semiconductor, for example, and the movable electrode plate 2 will be formed out of a p-type poly-silicon semiconductor, thereby to form the p-n junction therebetween, and a reverse bias voltage or current will be applied to the p-n junction, which results in the electrical insulation between the movable electrode plate 2 and the stationary electrode substrate 8. It goes without saying that the junction between the movable electrode plate 2 and the stationary electrode substrate 8 may also be electrically insulated by use of other methods.

In addition, as will be easily understood from the sectional view of FIG. 2, the four beams 21, the movable electrode plate 2, the four connecting portions 211, and the movable electrode supporting frame 10 are usually formed integrally with one another. That is, in case of forming the four connecting portions 211 on the movable electrode supporting frame 10 using a semiconductor integrated circuit manufacturing technique, the movable electrode plate 2 and the four beams 21 are formed at the same time. Consequently, the four beams 21, the movable electrode plate 2, the four connecting portions 211 and the movable electrode supporting frame 10 are formed integrally with one another. Since such manufacturing method for the optical switch SW is well known, the explanation thereof will be omitted here.

Next, the operation of the optical switch SW constructed as discussed above will be described with reference to FIGS. 3 and 4.

FIG. 3 is a plan view for explaining the above-constructed optical switch SW in practical use, wherein the optical switch SW is shown in plan view similar to FIG. 1. An input side optical waveguide, namely an optical fiber 4 in this example, for inputting an optical signal L into the optical switch SW is positioned at the left side of the optical switch SW in the drawing. An output side optical waveguide, namely an optical fiber 5 in this example, for transmitting the optical signal L supplied from the optical switch SW is aligned with the input side optical fiber 4 along a straight line passing through the mirror 3 at an angle of about 45° with the surface of the mirror 3, and another output side optical waveguide, namely an optical fiber 6 in this example, for transmitting the optical signal L supplied from the optical switch SW is disposed on a straight line passing through the mirror 3 and orthogonal to the aforesaid straight line.

FIG. 4 is a diagrammatical sectional view illustrating the manner that the optical switch SW shown in FIG. 3 is accommodated in a package 9 which is shown by only a pedestal 91 for putting the optical switch on the top thereof and fixing it thereto, and the peripheral or neighboring portion of the pedestal 91. Further, the optical switch SW is shown by a sectional view taken along the line 4—4 in FIG. 3 and looking in the direction indicated by the arrows. The input side optical fiber 4 and the output side optical fiber 5 are not sectioned.

As described above, since the mirror 3 is placed on the central portion of the movable electrode plate 2 along a diagonal line thereof, the optical signal L that is outputted from the output end of the input side optical fiber 4 and goes right on in a space is incident on the mirror 3 at an angle of about 45° with the surface of the mirror 3. As a result, the optical signal L is reflected by the mirror 3 in the direction of forming an angle of 90° (forming a right angle) with the incident light (the optical signal L is outputted from the mirror 3 at an angle of about 45° which is the same as the incident angle), and is transmitted to the input end of the output side optical fiber 6. In the specification, the transmission state of the optical signal L in which the optical signal L outputted from the input side optical fiber 4 is reflected by the mirror 3 and transmitted to the output side optical fiber 6 is defined as the steady state.

In the above steady state, in case of applying a predetermined voltage between the movable electrode plate 2 and the stationary electrode substrate 8 to generate an electrostatic force between the both electrodes in such manner that they are attracted each other, the beams 21 are elastic and flexible and the stationary electrode substrate 8 is immovable, and hence the movable electrode plate 2 is driven downwardly toward the stationary electrode substrate 8. Accordingly, if a voltage applied between the movable electrode plate 2 and the stationary electrode substrate 8 is controlled to displace or drive the movable electrode plate 2 downwardly so that the mirror 3 fixed to the top surface of the movable electrode plate 2 is displaced or driven downwardly to a position where the mirror 3 is out of the optical path on which any optical signal outputted from the input side optical fiber 4 goes right on, the optical signal L outputted from the input side optical fiber 4 will go right on without being reflected by the mirror 3 and be transmitted to the output side optical fiber 5. Thus, the optical signal L incident on the optical switch SW can be switched to any one of the two output side optical fibers 5 or 6 for transmission of it therethrough. In other words, the above-configured optical switch SW is capable of switching in space the path of an optical signal propagating through an optical waveguide or optical transmission line (path) without any intervention of a solid state optical waveguide.

However, as shown in FIG. 4, in case the optical switch SW is accommodated in the package 9, the bottom surface of the stationary electrode substrate 8 of the optical switch SW is fixed directly to the pedestal 91 of a generally square in plan formed on the package 9 by an appropriate adhesive agent, for example. For this reason, if a mechanical vibration or oscillation is transmitted to the package 9 from the outside thereof, the vibration is transmitted to the movable electrode plate 2 through the pedestal 91 of the package 9, the stationary electrode substrate 8 of the optical switch SW, the movable electrode supporting frame 10, the connecting portions 211, and the beams 21 in order of the description. As a result, the movable electrode plate 2 vibrates, and hence the mirror 3 secured to the movable electrode plate 2 vibrates, which results in a drawback that the operating characteristic of the optical switch SW is deteriorated.

SUMMARY OF THE INVENTION

It is an object of the present invention to provide an optical switch that the operating characteristic thereof is not influenced for bad by a vibration or oscillation.

It is another object of the present invention to provide an optical switch that any vibration or oscillation transmitted to a package is decreased by damping effects of a diaphragm and a space area thereby to prevent the vibration or oscillation from being transmitted to a movable electrode of the optical switch.

In order to accomplish the foregoing objects, in one aspect of the present invention, there is provided an optical switch which comprises: a stationary electrode; a movable electrode opposed to the stationary electrode with a predetermined space therebetween; and a mirror mounted to said movable electrode, wherein the movable electrode and the mirror are moved together by applying a voltage between the stationary electrode and the movable electrode thereby to switch the path of an incident optical signal to the optical switch, and being characterized in that a buffer member provided with a diaphragm is attached to the bottom of the stationary electrode.

In a preferred embodiment, the aforesaid buffer member comprises: a diaphragm of a predetermined thickness; a peripheral wall formed on and integrally with the periphery of the diaphragm for supporting the diaphragm and including a first frame-like portion protruding upwardly from the top surface of the diaphragm and a second frame-like portion protruding downwardly from the bottom surface of the diaphragm; at least one ventilating cutout formed in the first frame-like portion of the peripheral wall on the top surface side of the diaphragm; and a pedestal mount portion formed on and integrally with substantially the central portion of the bottom surface of the diaphragm and protruding downwardly.

In addition, the first frame-like portion of the peripheral wall of the buffer member on the top surface side of the diaphragm is joined with the bottom surface of the stationary electrode to form a space area communicating with the outside atmosphere through only the cutout between the top surface of the diaphragm and the bottom surface of the stationary electrode, and an external vibration or oscillation is substantially prevented from being transmitted to the movable electrode by the damping effects of the diaphragm and the space area.

In a specific example, the height of the first frame-like portion of the peripheral wall of the buffer member on the top surface side of the diaphragm is about 5 $\mu$m, and the space area having its thickness of about 5 $\mu$m is formed between the top surface of the diaphragm and the bottom surface of the stationary electrode.

In addition, the diaphragm of the buffer member is formed from a generally square or rectangular silicon substrate, and the peripheral wall of a generally square or rectangle formed on and integrally with the periphery of the diaphragm and the pedestal mount portion formed on and integrally with substantially the central portion of the bottom surface of the diaphragm are also formed from said silicon substrate, and the cutout reaching the top surface of the diaphragm is formed on the generally square or rectangular first frame-like portion of the peripheral wall on the top surface side of the diaphragm at opposed positions thereof.

With the construction as described above, between the bottom of the stationary electrode and the top surface of the diaphragm of the buffer member is formed a space area communicating with the outer atmosphere through only the cutout. Since the space area acts like an air cushion, its damping effect to a vibration or oscillation is remarkable as well as the diaphragm. Consequently, even if an external mechanical vibration or oscillation should be transmitted to the optical switch, the vibration is decreased by the damping effects of the diaphragm and the space area, and hence is substantially not transmitted to the movable electrode plate.

BRIEF DESCRIPTION OF THE DRAWINGS

FIG. 8 shows the buffer member shown in FIGS. 6 and 7.

DETAILED DESCRIPTION OF THE PREFERRED EMBODIMENTS

The preferred embodiment of the present invention will now be described in detail with reference to FIGS. 5 to 10. The present invention may, however, be embodied in many different forms and should not be construed as limited to the embodiment set forth hereinafter; rather, the embodiment is provided so that this disclosure will be thorough and complete, and will fully convey the scope of the invention to those skilled in the art.

Figure 5:
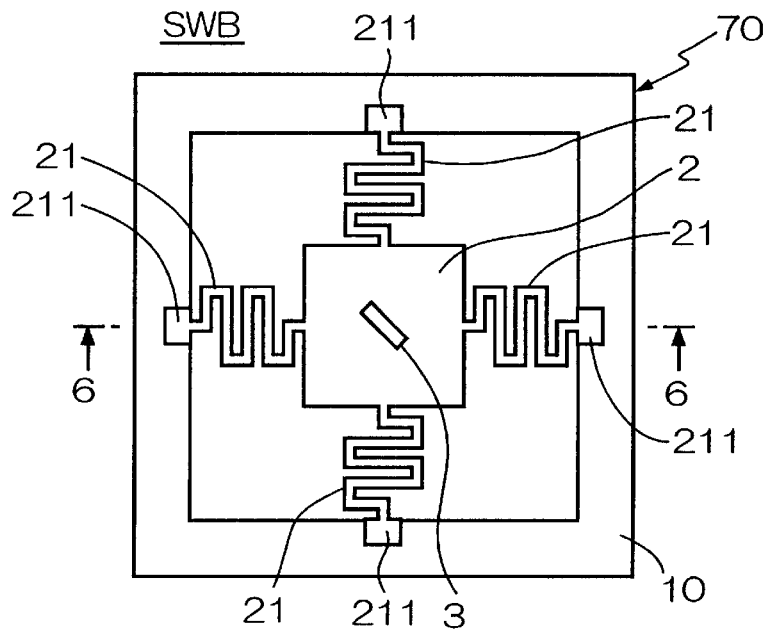
FIG. 5 is a plan view showing an embodiment of the optical switch according to the present invention.
Figure 6:
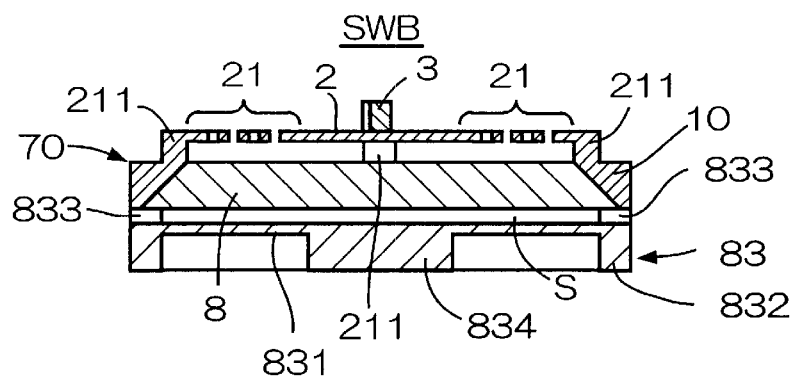
FIG. 6 is a sectional view taken along the line 6—6 in FIG. 5 and looking in the direction indicated by the arrows.
Figure 7:
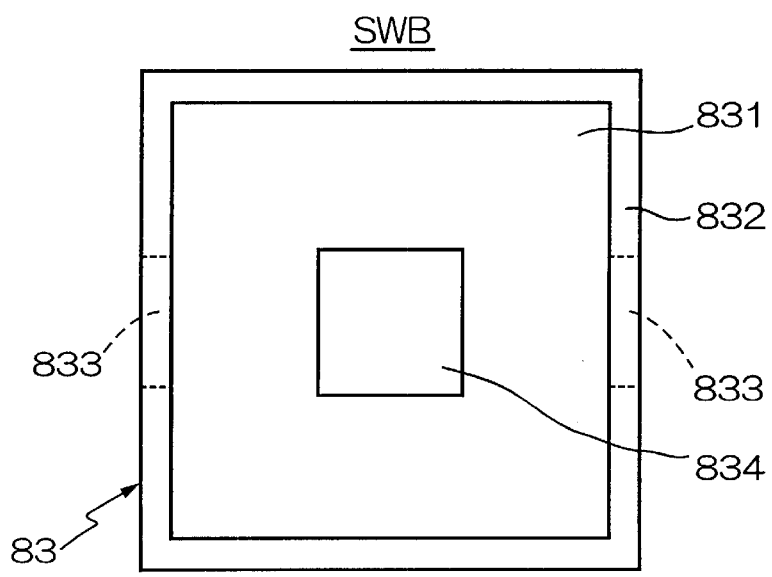
FIG. 7 is a rear view of FIG. 5.
Figure 8A:
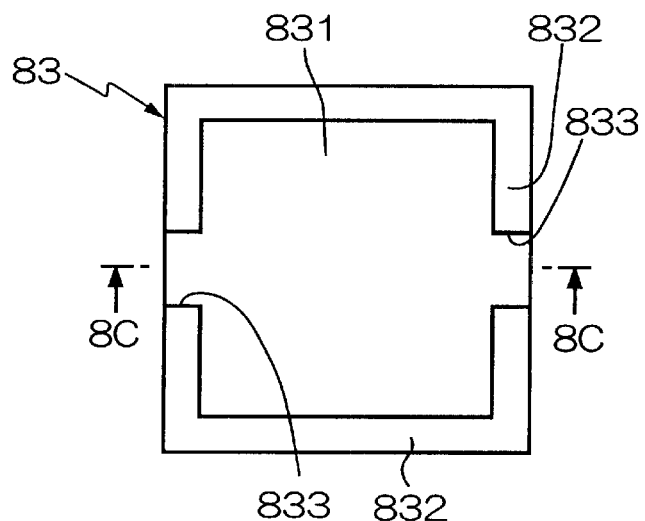
FIG. 8A is a plan view of the buffer member.
Figure 8B:
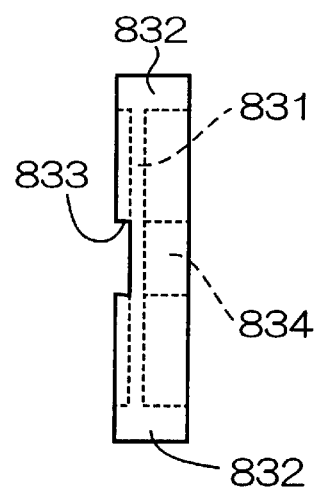
FIG. 8B is a right side view of FIG. 8A.
Figure 8C:
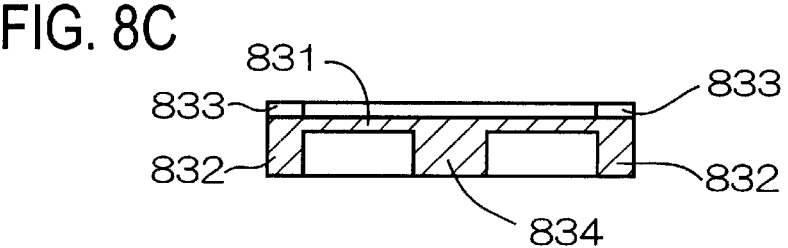
FIG. 8C is a sectional view taken along the line 8C—8C in FIG. 8A and looking in the direction indicated by the arrows.
Figure 8D:
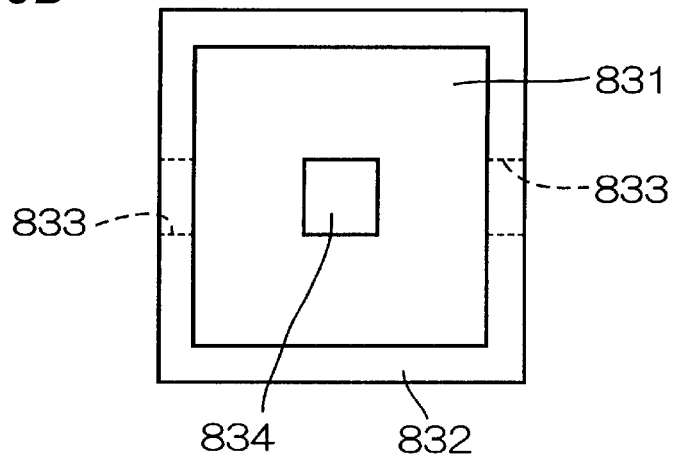
FIG. 8D is a rear view of FIG. 8A.

FIG. 5 is a plan view showing an embodiment of the optical switch according to the present invention, FIG. 6 is a sectional view taken along the line 6—6 in FIG. 5 and looking in the direction indicated by the arrows, and FIG. 7 is a rear view of FIG. 5. The optical switch SWB in this embodiment comprises: an optical switch part 70 that may have the same construction as that of the prior art optical switch SW shown in FIGS. 1 and 2 and discussed above; and a buffer member or shock absorbing member 83 joined with the bottom of the optical switch part 70. Accordingly, the optical switch part 70 used in this embodiment may have the same construction as that of the prior art optical switch SW shown in FIGS. 1 and 2 and discussed above, and hence portions or elements in FIGS. 5 and 6 corresponding to those in FIGS. 1 and 2 will be shown by the same reference characters affixed thereto, and the explanation thereof will be omitted unless it is necessary.

Next, the buffer or shock absorbing member 83 attached to the bottom of the optical switch part 70 will be described in detail with reference to FIG. 8 in addition to FIGS. 5 to 7.

The shock absorbing member 83 in this embodiment comprises: as is clear from FIG. 8, a diaphragm 831 of a generally square in plan; a frame-like peripheral wall 832 of a generally square in plan formed on and integrally with the periphery of the diaphragm 831 for supporting the diaphragm 831; one pair of ventilating cutouts 833 formed on the upper end surface of the frame-like peripheral wall 832 at two spots or places thereof opposed to each other; and a mount portion 834 of a generally square in plan to be mounted to a pedestal (hereinafter referred to as pedestal mount portion) formed on and integrally with substantially the central portion of the lower surface of the diaphragm 831 and protruding downwardly from the lower surface of the diaphragm 831, the pedestal mount portion 834 being mounted on the pedestal 91 of the package 9 as described later.

The outer measurement (size) of the peripheral wall 832 is set, as is apparent from FIG. 6, to the same value as that of the movable electrode supporting frame 10 of the optical switch part 70. In addition, the peripheral wall 832 is provided with a first frame-like portion protruding upwardly from the top surface of the diaphragm 831 and a second frame-like portion protruding downwardly from the bottom surface of the diaphragm 831. As is clear from FIGS. 8A and 8B, the pair of ventilating cutouts 833 are formed by cutting out two opposed spots of the first frame-like portion of the peripheral wall 832 protruding upwardly from the top surface of the diaphragm 831 until they are flush with the top surface of the diaphragm 831. In this embodiment, though the cutouts 833 are formed at two spots of the first frame-like portion that are substantially symmetrical about the center of the diaphragm 831, the number of the cutouts 833 and spots or places where the cutouts 833 are to be formed are not limited to the illustrated example. The pedestal mount portion 834 is set such that the height of the downward protrusion thereof becomes equal to the height of the second frame-like portion of the peripheral wall 832 protruding downwardly.

The height of the first frame-like portion of the peripheral wall 832 protruding upwardly from the top surface of the diaphragm 831 is set to be considerably lower than that of the second frame-like portion of the peripheral wall 832 protruding downwardly from the bottom surface of the diaphragm 831. Accordingly, in case the optical switch part 70 is joined with the shock absorbing member 83, as will be easily understood from FIG. 6, between the bottom of the optical switch part 70 and the top surface of the diaphragm 831 of the shock absorbing member 83 is formed a space area S that is an air layer communicating with the outer atmosphere through the pair of the cutouts 833. In other words, the height of the first frame-like portion of the peripheral wall 832 protruding upwardly from the top surface of the diaphragm 831 is set such that the space area S acting like an air cushion through the ventilating cutouts 833 can be formed between the bottom of the optical switch part 70 and the top surface of the diaphragm 831 of the shock absorbing member 83.

The shock absorbing member 83 constructed as discussed above is attached to the bottom of the optical switch part 70 by, for example, an appropriate adhesive agent, and thus, the optical switch SWB shown in FIGS. 5 to 7 is completed.

Next, an example of the manufacturing method for the aforesaid shock absorbing member 83 will be described with reference to FIG. 9.

Figure 9A:
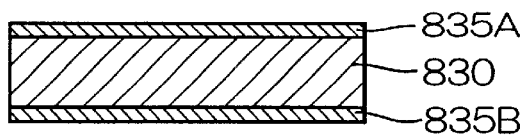
FIGS. 9A to 9J are sectional views and plan views for explaining the manufacturing processes of the buffer member shown in FIG. 8.

At first, a silicon substrate having a predetermined shape and size (in this example, a generally square silicon substrate having a predetermined thickness and surface area) is prepared, and as shown in FIG. 9A, silicon dioxide ($SiO_2$) layers 835A and 835B are formed on both the top and bottom surfaces of the silicon substrate 830, respectively, by thermal oxidation.

Next, a photoresist, for example, is applied all over the surface of the silicon dioxide layer 835A over the top surface of the silicon substrate 830, and thereafter, portions of the photoresist corresponding to the shape of the diaphragm 831 and the shapes of the two cutouts 833 are removed respectively by a photoetching process.

Figure 9B:
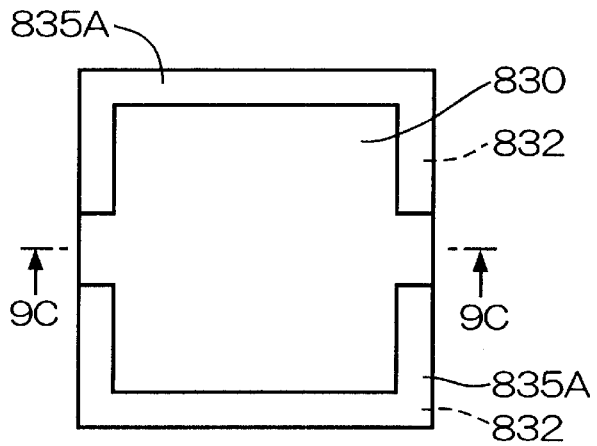
Figure 9C:
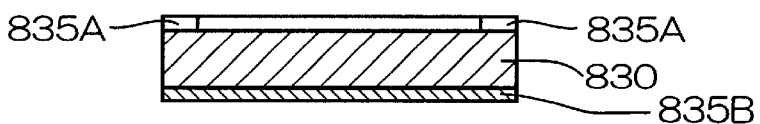

Then, portions of the silicon dioxide layer 835A where the photoresist thereon have been removed are removed by etching. FIG. 9B is a plan view illustrating the state that portions of the silicon dioxide layer 835A corresponding to the shape of the diaphragm 831 and the shapes of the two cutouts 833 have been removed by etching, and FIG. 9C is a sectional view taken along the line 9C—9C in FIG. 9B and looking in the direction indicated by the arrows. This process exposes the top surface of the silicon substrate 830 in the shape of the diaphragm 831 and the shapes of the two cutouts 833.

Figure 9D:
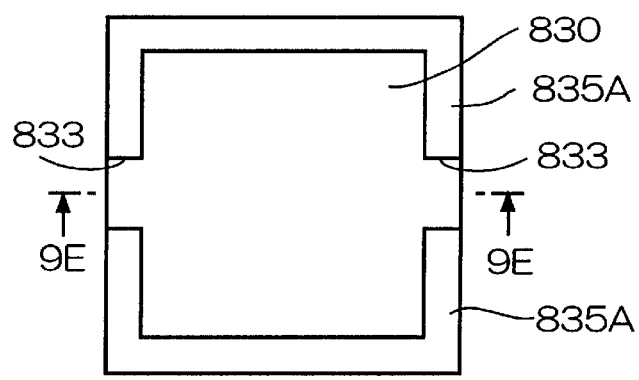
Figure 9E:
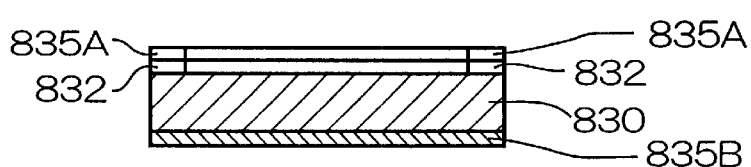

Next, the exposed portions of the silicon substrate 830 in the shape of the diaphragm 831 and the shapes of the two cutouts 833 are removed by a predetermined thickness, in the order of 5 µm (micrometers) in this example, by etching. The result is shown in FIGS. 9D and 9E. FIG. 9D is a plan view thereof and FIG. 9E is a sectional view taken along the line 9E—9E in FIG. 9D and looking in the direction indicated by the arrows. Upon completion of this process, the top surface of the silicon substrate is exposed in a generally square portion which will become the top surface of the diaphragm 831 and small rectangular portions corresponding to the two cutouts 833, the generally square frame-like peripheral wall 832 having its height of 5 µm is formed at the periphery of the top surface of the diaphragm 831, and the two cutouts 833 are formed at substantially symmetrical positions about the center of the diaphragm 831 (at the positions of bilateral symmetry in the drawing).

Next, a photoresist, for example, is applied all over the surface of the silicon dioxide layer 835B over the bottom surface of the silicon substrate 830, and thereafter, a generally square portion of the photoresist corresponding to the shape of the diaphragm 831 except a generally square portion of the photoresist located at the central portion thereof corresponding to the shape of the pedestal mount portion 834 is removed by a photoetching process.

Figure 9F:
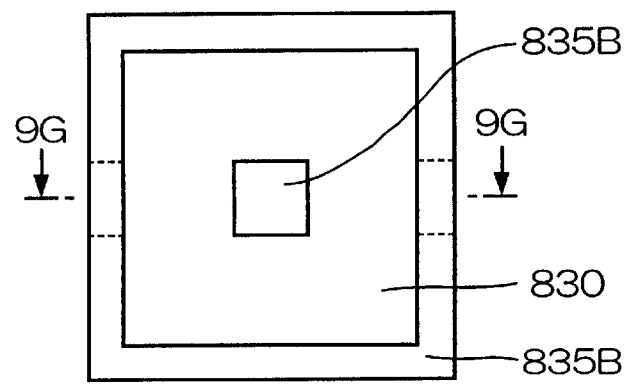
Figure 9G:
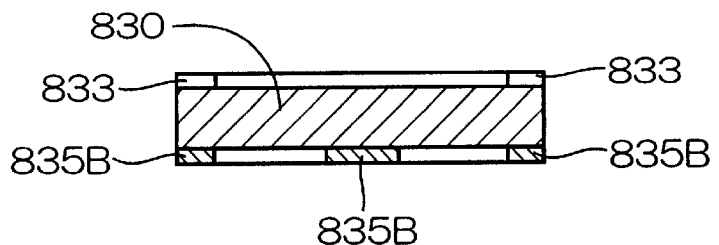

Then, a portion of the silicon dioxide layer 835B where the photoresist thereon have been removed is removed by etching. FIG. 9F is a plan view illustrating the state that a portion of the silicon dioxide layer 835B corresponding to the shape of the diaphragm 831 except a portion thereof corresponding to the shape of the pedestal mount portion 834 has been removed by etching, and FIG. 9G is a sectional view taken along the line 9G—9G in FIG. 9F and looking in the direction indicated by the arrows. This process leaves a generally square frame-like silicon dioxide layer 835B and a generally square silicon dioxide layer 835B at the periphery and central portion of the bottom surface of the silicon substrate 830, respectively, and therefore, the bottom surface of the silicon substrate 830 is exposed in the shape of the diaphragm 831 except the central portion of the bottom surface.

Figure 9H:
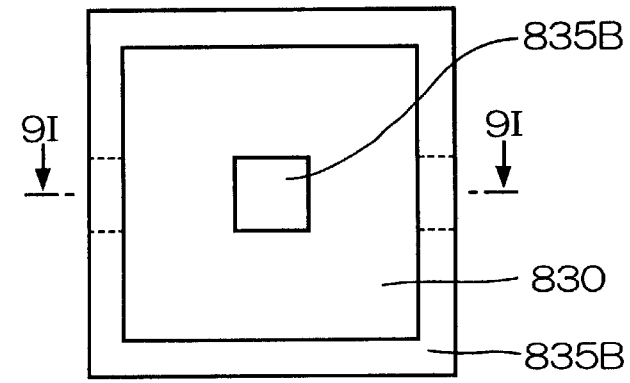
Figure 9I:
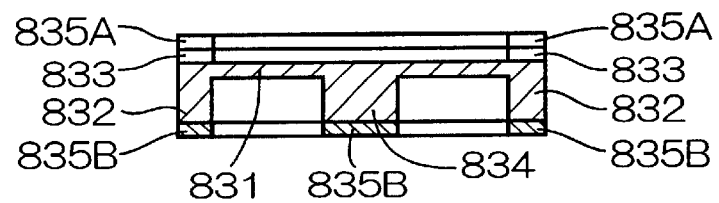

Next, the exposed portion of the bottom surface of the silicon substrate 830 is removed by a predetermined thickness, in the order of 300 µm in this example, by etching. The result is shown in FIGS. 9H and 9I. FIG. 9H is a plan view thereof and FIG. 9I is a sectional view taken along the line 9I—9I in FIG. 9H and looking in the direction indicated by the arrows. Upon completion of this process, the bottom surface of the silicon substrate is exposed in a generally square portion which will become the bottom surface of the diaphragm 831 except a generally square island-like portion located at the central portion of the silicon substrate, the generally square frame-like peripheral wall 832 having its height of 300 µm is formed at the periphery of the bottom surface of the diaphragm 831, and the generally square pedestal mount portion 834 having its height of 300 µm is formed at the central portion of the bottom surface of the diaphragm 831.

Further, in this embodiment, the thickness of the original silicon substrate 830 not etched is selected such that the thickness of the diaphragm 831 falls within the range from several µm to several tens µm after it has been etched. Since the thickness of the diaphragm 831 may be changed within a range in which a diaphragm can give a large damping effect to a vibration or oscillation, it is not always limited to the values of the embodiment.

Figure 9J:
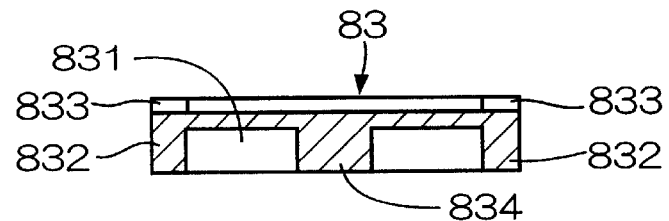

Next, as shown in FIG. 9J, the remaining silicon oxide layers 835A and 835B on both the top and bottom surfaces of the silicon substrate 830 are removed. Thus, the shock absorbing member or buffer member 83 of this embodiment shown in FIG. 8 can be obtained.

Figure 4:
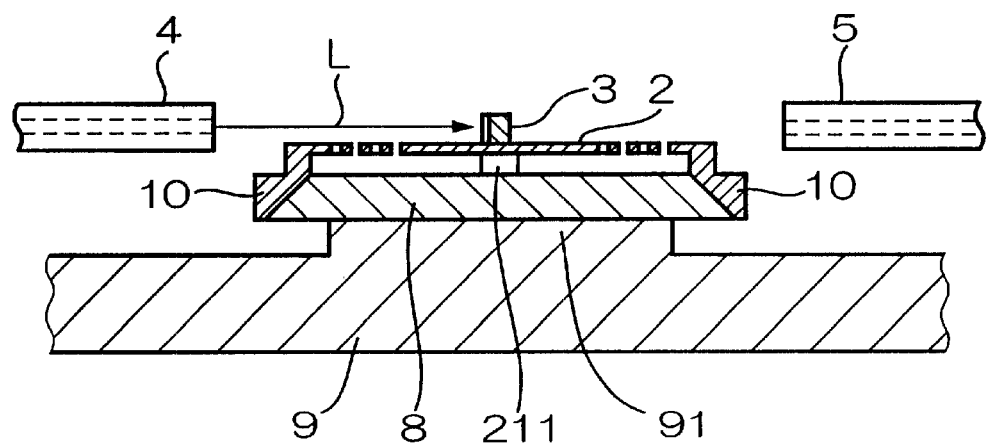
FIG. 4 is a diagrammatical sectional view illustrating the manner that the optical switch shown in FIG. 3 is accommodated in a package.
Figure 10:
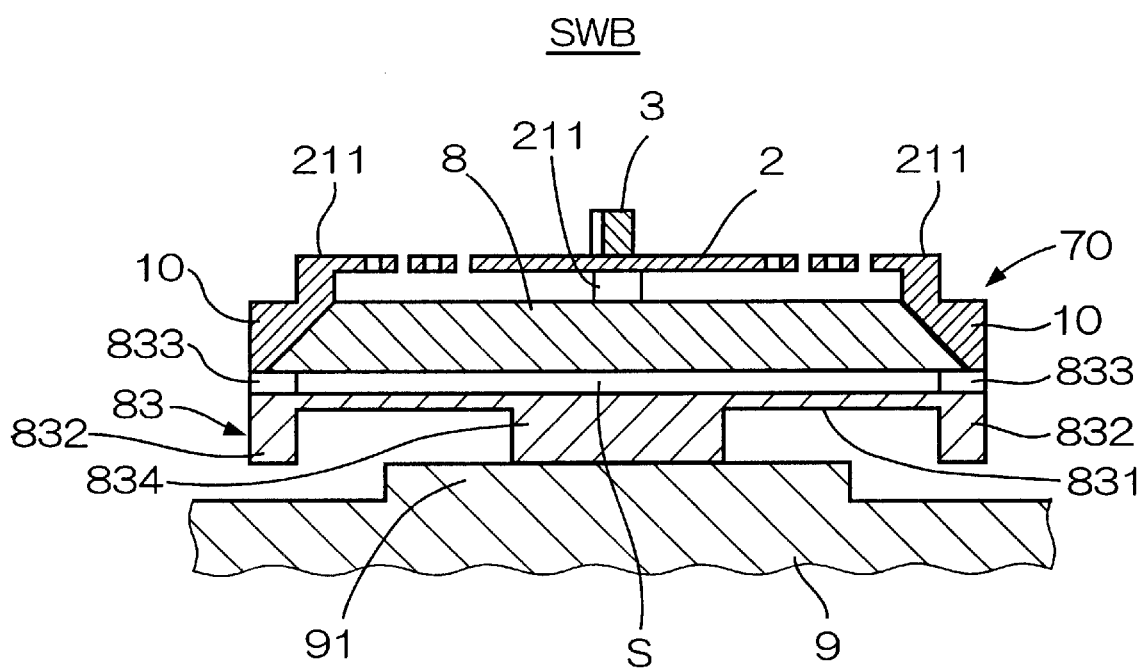
FIG. 10 is a diagrammatical sectional view illustrating the manner that the optical switch shown in FIGS. 5 to 7 is accommodated in a package.

The optical switch SWB of this embodiment having the above-constructed shock absorbing member 83 attached thereto is used by housing it in a package 9 as shown in FIG. 10. The package 9 may be one that has the same construction as that of the prior art package 9 shown in FIG. 4, and is provided with a pedestal 91 on which the optical switch SWB is put and fixed thereto. The optical switch SWB is fixed within the package 9 by joining the bottom surface of the pedestal mount portion 834 formed integrally with the bottom surface of the diaphragm 831 of the optical switch SW with the top surface of the pedestal 91 by use of an appropriate adhesive agent, for example.

With the construction as described above, between the bottom of the optical switch part 70 and the top surface of the diaphragm 831 of the shock absorbing member 83 is formed a space area S that is an air layer communicating with the outer atmosphere through only the pair of the cutouts 833. Since the space area S acts like an air cushion, its damping effect to a vibration or oscillation is remarkable as well as the diaphragm 831. As a result, if a mechanical vibration or oscillation should be generated in the outside of the optical switch SWB and transmitted to the package 9, the vibration is completely or greatly decreased by the damping effects of the diaphragm 831 and the space area S existing in the way of the vibration transmission path, and hence is substantially not transmitted to the movable electrode plate 2.

Specifically explaining, between the outside of the optical switch SWB and the movable electrode plate 2 is formed the vibration transmission path in a serial manner constituted by the pedestal 91 of the package 9, the pedestal mount portion 834 of the buffer member 83, the diaphragm 831, the space area S, the stationary electrode substrate 8, the movable electrode supporting frame 10, the connecting portions 211, and the beams 21. However, in this vibration transmission path are interposed the diaphragm 831 and the space area S each of which has a large damping effect, and so any external vibration or oscillation applied to the package 9 is completely or almost decreased by the multiplied damping effects of the diaphragm 831 and the space area S. As a result, the vibration or oscillation is not transmitted to the movable electrode plate 2, or even if it should be transmitted to the movable electrode plate 2, it is decreased to such an extremely weak one that the mirror 3 substantially does not vibrate. Accordingly, there is obtained a remarkable advantage that an optical switch can be provided the operating characteristic of which is not deteriorated even an external vibration or oscillation is transmitted to the package 9. In addition, since the buffer member 83 is a thin and planar-shaped member having the diaphragm 831, it is best suited for a member to be joined with the thin and planar-shaped optical switch part 70.

Figure 1:
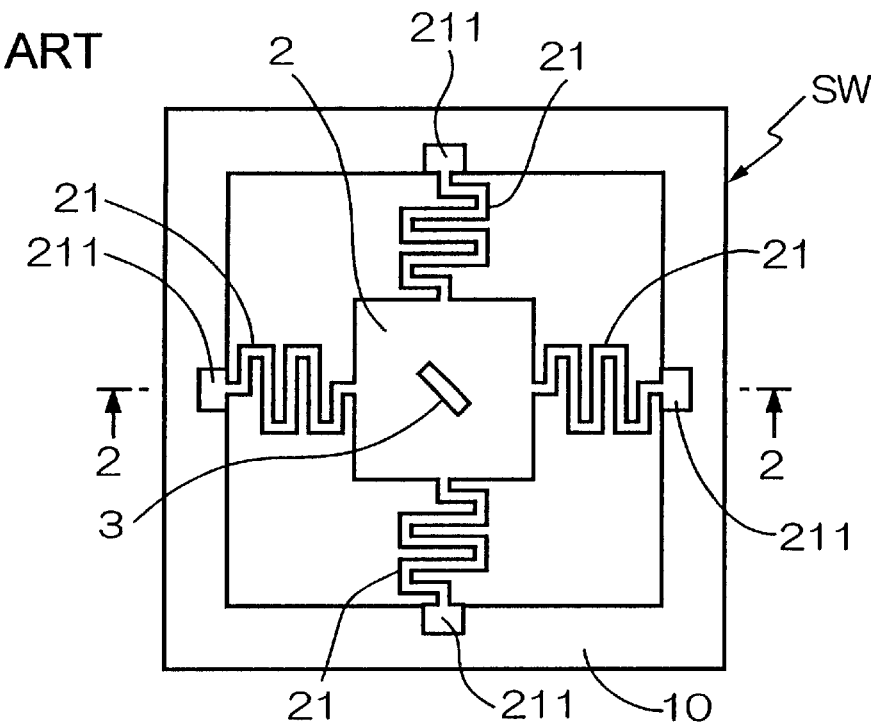
FIG. 1 is a plan view showing an example of the prior art optical switch.
Figure 2:
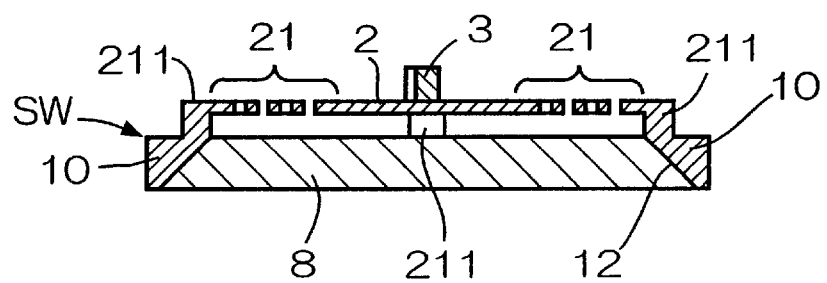
FIG. 2 is a sectional view taken along the line 2—2 in FIG. 1 and looking in the direction indicated by the arrows.
Figure 3:
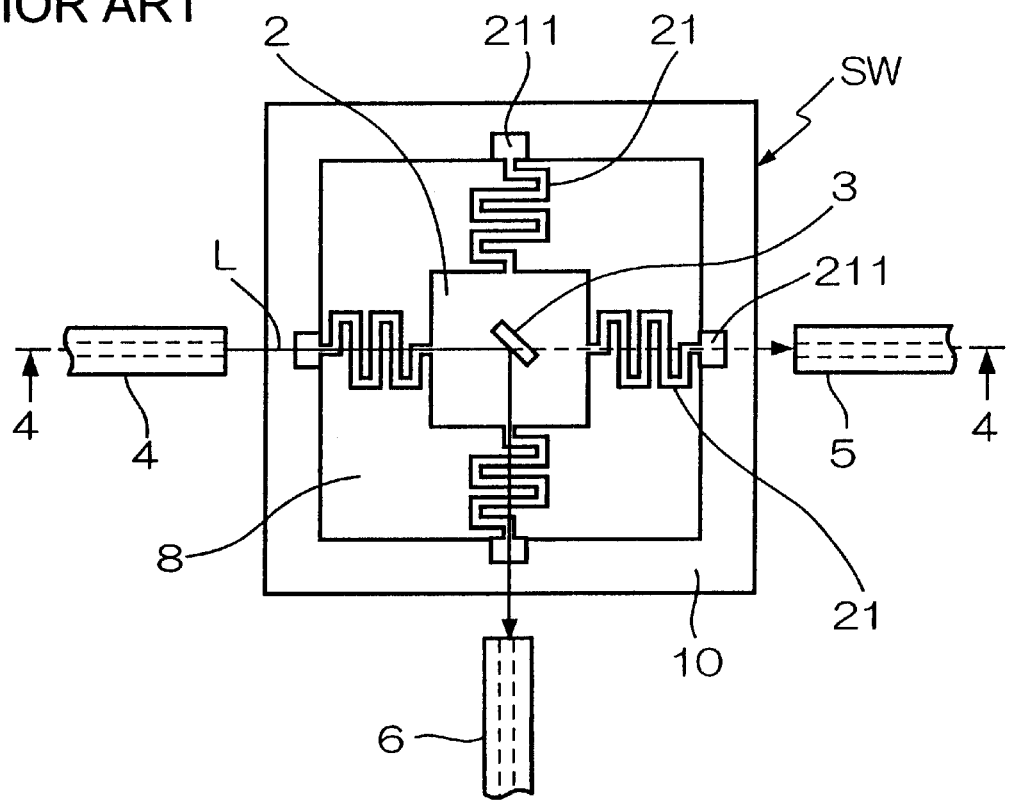
FIG. 3 is a diagrammatical plan view for explaining the optical switch shown in FIG. 1 in practical use.

In the aforesaid embodiment, there has been illustrated a case that the buffer member 83 is attached to the optical switch part 70 having the same construction as that of the prior art optical switch shown in FIGS. 1 and 2. However, it is needless to say that the buffer member 83 of the above embodiment can be also attached to other known prior art optical switch or switches, and that the same function and effect can be obtained therefrom. For example, the buffer member 83 of the above embodiment can be also attached to an optical switch that comprises: a stationary electrode substrate made of an n-type or p-type silicon; two connecting portions; two elastic and flexible beams; and a movable electrode plate supported by the two beams, wherein the two connecting portions, the two elastic and flexible beams, and the movable electrode plate all are made of a p-type or n-type poly-silicon and are formed integrally with one another on the stationary electrode substrate without using a movable electrode supporting frame, and the same function and effect can be obtained therefrom.

Further, it goes without saying that the number, shape and size of the connecting portions, the number, shape and size of the beams, shapes and sizes of the movable electrode plate, stationary electrode substrate, and the like, or shapes, sizes or the like of the diaphragm, peripheral wall, and cutout of the buffer member are not limited to the illustrated example, and can be modified, altered or changed variously if the need arises.

While the present invention has been described with regard to the preferred embodiment shown by way of example, it will be apparent to those skilled in the art that various modifications, alterations, changes, and/or minor improvements of the embodiment described above can be made without departing from the spirit and the scope of the present invention. Accordingly, it should be understood that the present invention is not limited to the illustrated embodiment, and is intended to encompass all such modifications, alterations, changes, and/or minor improvements falling within the scope of the invention defined by the appended claims.

What is claimed is:

1. An optical switch comprising:

a stationary electrode;

a movable electrode opposed to said stationary electrode with a predetermined space therebetween;

a mirror mounted to said movable electrode; and a buffer member provided with a diaphragm and attached to the bottom of the stationary electrode, wherein the movable electrode and the mirror are moved together by applying a voltage between the stationary electrode and the movable electrode thereby to switch the path of an incident optical signal to the optical switch.

2. The optical switch as set forth in claim 1, wherein said buffer member comprises: a diaphragm of a predetermined thickness; a peripheral wall formed on and integrally with the periphery of said diaphragm for supporting the diaphragm and including a first frame-like portion protruding upwardly from the top surface of the diaphragm and a second frame-like portion protruding downwardly from the bottom surface of the diaphragm; at least one ventilating cutout formed in the first frame-like portion of said peripheral wall on the top surface side of the diaphragm; and a pedestal mount portion formed on and integrally with substantially the central portion of the bottom surface of the diaphragm and protruding downwardly.

3. The optical switch as set forth in claim 2, wherein the first frame-like portion of the peripheral wall of the buffer member on the top surface side of the diaphragm is joined with the bottom surface of the stationary electrode to form a space area communicating with the outside atmosphere through only said cutout between the top surface of the diaphragm and the bottom surface of the stationary electrode, and an external vibration or oscillation is substantially prevented from being transmitted to the movable electrode by the damping effects of the diaphragm and the space area.

4. The optical switch as set forth in claim 3, wherein the height of the first frame-like portion of the peripheral wall of the buffer member on the top surface side of the diaphragm is about 5 $\mu$m, and the thickness of the space area formed between the top surface of the diaphragm and the bottom surface of the stationary electrode is about 5 $\mu$m.

5. The optical switch as set forth in claim 4, wherein the diaphragm of the buffer member is formed out of a generally square or rectangular silicon substrate, and the peripheral wall of a generally square or rectangle formed on and integrally with the periphery of the diaphragm and the pedestal mount portion formed on and integrally with substantially the central portion of the bottom surface of the diaphragm are also formed out of said silicon substrate, and the cutout reaching the top surface of the diaphragm is formed on the generally square or rectangular first frame-like portion of the peripheral wall on the top surface side of the diaphragm at opposed positions thereof.

6. The optical switch as set forth in claim 3, wherein the diaphragm of the buffer member is formed out of a generally square or rectangular silicon substrate, and the peripheral wall of a generally square or rectangle formed on and integrally with the periphery of the diaphragm and the pedestal mount portion formed on and integrally with substantially the central portion of the bottom surface of the diaphragm are also formed out of said silicon substrate, and the cutout reaching the top surface of the diaphragm is formed on the generally square or rectangular first frame-like portion of the peripheral wall on the top surface side of the diaphragm at opposed positions thereof.

7. The optical switch as set forth in claim 2, wherein the diaphragm of the buffer member is formed out of a generally square or rectangular silicon substrate, and the peripheral wall of a generally square or rectangle formed on and integrally with the periphery of the diaphragm and the pedestal mount portion formed on and integrally with substantially the central portion of the bottom surface of the diaphragm are also formed out of said silicon substrate, and the cutout reaching the top surface of the diaphragm is formed on the generally square or rectangular first frame-like portion of the peripheral wall on the top surface side of the diaphragm at opposed positions thereof.

* * * * *